United States Patent [19]
Kaede et al.

[11] Patent Number: 5,392,147
[45] Date of Patent: Feb. 21, 1995

[54] OPTICAL TRUNK TRANSMISSION SYSTEM AND AN OPTICAL REPEATER CIRCUIT

[75] Inventors: Kazuhisa Kaede; Isamu Takano, both of Tokyo, Japan

[73] Assignee: NEC Corporation, Tokyo, Japan

[21] Appl. No.: 964,398

[22] Filed: Oct. 21, 1992

[30] Foreign Application Priority Data

Oct. 21, 1991 [JP] Japan .................. 3-271615
Oct. 21, 1991 [JP] Japan .................. 3-271617
Oct. 21, 1991 [JP] Japan .................. 3-271619

[51] Int. Cl.⁶ .................................... H04B 10/04
[52] U.S. Cl. ............................ 359/181; 359/183; 359/187
[58] Field of Search ............. 359/81, 158, 176, 179, 359/177, 187, 181, 183; 375/81

[56] References Cited

U.S. PATENT DOCUMENTS

| | | | |
|---|---|---|---|
| 2,987,683 | 6/1961 | Powers | 455/102 |
| 3,054,073 | 9/1962 | Powers | 455/110 |
| 4,485,358 | 11/1984 | Andren | 455/102 |
| 4,546,322 | 10/1985 | Crutcher | 375/81 |
| 4,592,071 | 5/1986 | Prigent | 375/81 |
| 4,710,976 | 12/1987 | Wakabayashi | 359/177 |
| 4,982,446 | 1/1991 | Lord | 359/179 |
| 4,987,375 | 1/1991 | Wu | 375/81 |
| 5,079,525 | 1/1992 | Ishikawa | 455/102 |
| 5,097,353 | 3/1992 | Fujiwara | 359/177 |

OTHER PUBLICATIONS

Saito et al., "Prechirp Technique for Dispersion Compensation for a High Speed Long-Span Transmission" pp. 74–76; IEEE Photonics Tech. Ltrs. vol. 3, No. 1, Jan. 1991.

Henmi et al., Technical Digest PD8 (Post Deadline Paper #8); Inter National Comference on Fiber Communication, 1990 pp. 1–4.

K. Nakagawa et al.; "Trunk and Distribution Network Application of Erbium-Doped Fiber Amplifier." J. of Lightwave Tech; vol. 9, No. 2, Feb. 1991, pp. 198–208.

*Primary Examiner*—Leslie Pascal
*Attorney, Agent, or Firm*—Ostrolenk, Faber, Gerb & Soffen

[57] ABSTRACT

The object of this invention is to offer an optical transmission system that can perform not only amplification of optical signal level but also dispersion pre-equalization, as the signals are optical.

In this invention, optical power level of an optical signal propagating through the dispersion medium 101a is amplified in the optical amplifier 102, the signal becomes the optical signal a. The phase modulator driving circuit 104 outputs a signal corresponding to the envelope signal of the optical signal a. The optical phase modulator 103 charged the signal phase-modulates the input optical signal a, outputs the optical signal d which is performed dispersion pre-equalization to dispersion medium 101b.

4 Claims, 14 Drawing Sheets

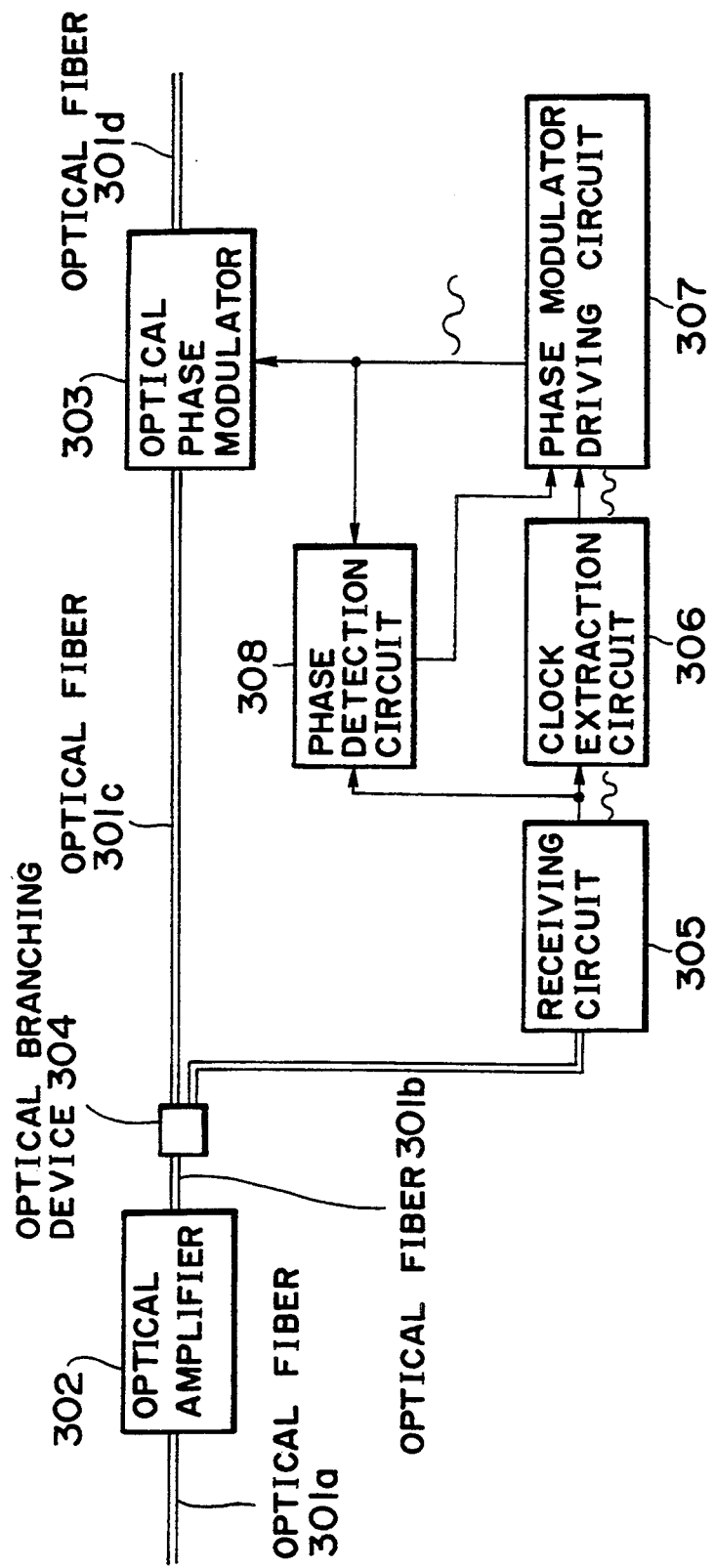
F I G. 4

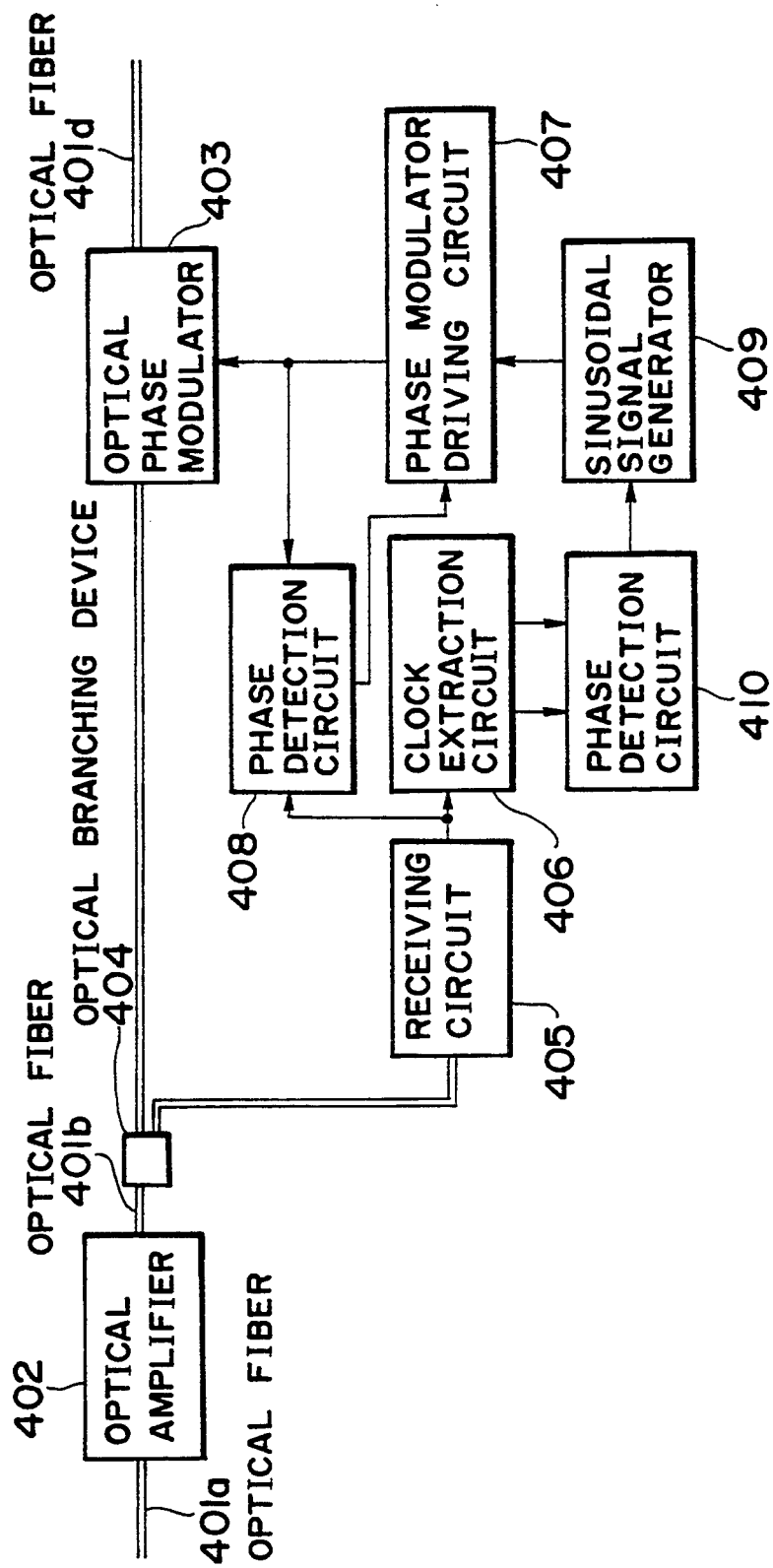
F I G. 9

OPTICAL TRUNK TRANSMISSION SYSTEM AND AN OPTICAL REPEATER CIRCUIT

BACKGROUND OF THE INVENTION

This invention relates to an optical trunk system repeating signals as they are optical and an optical repeater circuit used in this system.

A prior art trunk transmission system utilizing optical signals comprises a 1R optical trunk transmission system utilizing optical amplifiers. The 1R system is constructed to compensate a transmission loss of a power level of a signal light in an optical fiber transmission path, to raise the power level of a signal light to a constant level, and to send out the signal to the optical fiber transmission path. Moreover, the dispersion pre-equalization method called the prechirp method is proposed by N. Henmi and others in a paper reported on Technical Digest PD8 (Post Deadline paper #8) of Inter National Conference on Optical Fiber Communication, 1990. This method comprises the step of dispersion-pre-equalizing a sending signal light by frequency-modulating a semiconductor laser of an optical terminal office, to decrease power penalty caused by wavelength dispersion, to expand a repeater spacing.

Also, the optical trunk transmission method as below is practiced. In this method, as introduced by K. Nakagawa and others in a paper titled "Trunk and distribution network application of Erbium-doped fiber amplifier" reported on pp.198 to pp.208 of "Journal of lightwave technology" second issue, vol.9 by IEEE on February 1991, it is in general to practice regenerative repeating consisting of 3R (reshaping, retiming, regenerating) in each repeater spacing for limiting or reducing dispersion and loss, and in general to practice 3R regenerative repeating after practicing collectively amplification of wavelength by 1R (reshaping) which is constructed by an optical amplifier to dispersion limited or noise limited caused by noise accumulation of the optical amplifier. Also in case of practicing optical trunk transmission of an wavelength-multiplexed signal consisting of N (N is a positive integer) waves, the signal is sent out to an optical transmission path after dividing the waves at each repeater point, repeating by one of the above-mentioned ways at each wavelength and multiplexing the waves of all wavelengths again.

However, in the conventional optical trunk transmission system that repeats and transmits a signal as it is optical utilizing an optical amplifier, there is a problem that transmission length is restricted by wavelength dispersion because of an influence of deterioration of waveform by wavelength dispersion in the optical fiber, although the power level of the signal light is amplified. Moreover, in the prechirp method that compensates the influences by wavelength dispersion in advance and sends out a signal light, there is a problem that the maximum transmission length is restricted because the compensatable wavelength dispersion value is restricted in practice.

Furthermore, even practicing 3R regeneratively repeating, when sending a wavelength-multiplexed signal of N waves, such optical trunk transmission system comprising of dividing N waves at each repeater and regeneratively repeating each wavelength has some problems that N light sources for sending N waves are needed for each repeater, the wavelength of each light source for sending has to be adjusted corresponding to the wavelength of each channel of the optical multiplexing circuit to select extremely high-accurate light sources for sending correspondingly to wavelength of each channel, and they are required extremely high stability for temperature change and age-deterioration. Additionally, there is another problem that control circuits are naturally needed in such system, and the size of such a system including control circuits becomes bigger more than N-times of a conventional single wavelength photonic repeater that does not need any high-accurate wavelength controllers.

SUMMARY OF THIS INVENTION

The object of this invention is to enable dispersion pre-equalization 1R multi-step trunk transmission by optically compensating the dispersion.

The object of this invention is achieved by an optical trunk transmission system to perform trunk transmission by performing a predetermined optical phase modulation to a phase of a signal light with synchronizing with a phase of an envelope signal of the signal light which is intensity-modulated and transmitted through a dispersion medium.

It is also feasible that a signal that intensity-modulates a signal light is an RZ modulated signal, and a signal that optically phase-modulates said signal light is a sine-wave modulated signal of said RZ signal's fundamental frequency.

Moreover, it is also feasible that a signal that intensity-modulates a signal light is an NRZ signal, and a signal that optically phase-modulates said signal light is an NRZ signal obtained by equalizing an electric signal obtained by opto-electro-conversing said signal light.

Furthermore, it is also feasible that a signal that intensity-modulates a signal light is an NRZ signal, and a signal that optically phase-modulates said signal light is an NRZ signal obtained by waveform-equalizing after performing discrimination decision for the electric signal obtained by opto-electro-conversing said signal light.

The above-mentioned optical trunk transmission system is performed by an optical repeating circuit comprising: optical amplifier means for optically amplifying a signal light propagated through an optical fiber transmission path;

optical branch circuit means for branching a part of an output light of the optical amplifier means;

optical phase modulator means connected with the first output terminal of the optical branch circuit, for phase-modulating an input signal and outputting the phase-modulated signal light to an optical fiber transmission path in backward step;

receiving circuit means connected with the second output terminal of said optical branch circuit, for converting an input signal light to an electric signal;

timing extraction circuit means for extracting a timing signal from the electric output signal of the receiving circuit means;

optical phase modulator driving circuit means for setting said timing signal at a predetermined amplitude of voltage, setting the signal in a predetermined phase according to a phase difference signal and driving said optical phase modulator; and phase detection circuit means for detecting phase difference of an output phase of the optical phase modulator driving circuit means and an envelope signal phase of the input signal into said optical phase modulator means, outputting a signal as said phase difference signal.

The above-mentioned optical trunk transmission system is performed by an optical repeater circuit comprising: optical amplifier means for optically amplifying a signal light propagated through an optical fiber transmission path;

optical branch circuit means for branching a part of an output light of the optical amplifier means;

optical phase modulator means connected with the first output terminal of the optical branch circuit, for phase-modulating an input signal and outputting the phase-modulated signal light to an optical fiber transmission path in backward step;

receiving circuit means connected with the second output terminal of said optical branch circuit, for converting an input signal light to an electric signal;

timing extraction circuit means for extracting a timing signal from the electric output signal of the receiving circuit means;

sinusoidal signal generator means for generating a sine-wave signal in a phase according to the first phase difference signal;

first phase detection circuit means for detecting phase difference of the phase of the output signal from the sinusoidal signal generator and the phase of said timing signal, and feeding back said first phase difference signal to said sinusoidal signal generator;

optical phase modulator driving circuit means for setting the output signal from said sinusoidal signal generator at a predetermined amplitude of voltage, setting the output signal in a predetermined phase according to the second phase difference signal; and second phase detection circuit means for detecting phase difference of the output phase of the optical phase modulator driving circuit means and the envelope signal phase of the input signal into said optical phase modulator means, outputting a signal as said second phase difference signal.

Moreover, the above-mentioned optical trunk transmission system is performed by an optical trunk circuit comprising:

optical amplifier means for optically amplifying a signal light propagated through an optical fiber transmission path;

optical branch circuit means for branching a part of an output light of the optical amplifier means;

optical phase modulator means connected with the first output terminal of the optical branch =circuit, for phase-modulating an input signal and outputting the phase-modulated signal light to an optical fiber transmission path in backward step;

receiving circuit means connected with the second output terminal of said optical branch circuit, for converting an input signal light to an electric signal;

equalization circuit means for equalizing an output of said receiving circuit close to the envelope waveform of the optical signal optical phase modulator driving circuit means for converting an output signal from said equalization circuit mean to an predetermined amplitude of voltage, setting the output signal to a predetermined phase according to the phase difference signal and driving said optical phase modulator; and phase detection circuit means for detecting a phase difference of an output phase of said optical phase modulator driving circuit means and an envelope signal phase input to said optical phase modulator means, outputting a signal as said phase difference signal.

Moreover, the above-mentioned optical trunk transmission system is performed by an optical repeater circuit comprising:

optical amplifier means for optically amplifying a signal light propagated through an optical fiber transmission path;

optical branch circuit means for branching a part of an output light of the optical amplifier means;

optical phase modulator means connected with the first output terminal of the optical branch circuit, for phase-modulating an input signal and outputting the phase-modulated signal light to an optical fiber transmission path in backward step;

receiving circuit means connected with the second output terminal of said optical branch circuit, for converting an input signal light to an electric signal;

timing extraction circuit means for extracting a timing signal from the electric output signal of the receiving circuit means;

discrimination decision circuit means for discriminating an electric output signal of said receiving circuit means referring said timing signal as a clock signal;

equalization circuit means for equalizing an output of said discrimination decision circuit means close to an envelope waveform of the optical signal;

optical phase modulator driving circuit means for converting an output signal from said equalization circuit mean to an predetermined amplitude of voltage, setting the output signal to a predetermined phase according to the phase difference signal and driving said optical phase modulator; and phase detection circuit means for detecting a phase difference of an output phase of said optical phase modulator driving circuit means and an envelope signal phase input to said optical phase modulator means, outputting a signal as said phase difference signal.

Furthermore, in case of wavelength-multiplexing N waves, it is preferable that a plurality of optical transmitters have each light source in different wavelength to others, optimum dispersion pre-equalization is performed for each wavelength, sending signal lights from said optical transmitters are multiplexed in the first optical multiplexing circuit and sent to an optical transmission path, optical multiplexed signals sent out to the optical transmission path are divided at optical dividing circuit into a plurality of wavelength corresponding to each wavelength of said optical transmitters at one or more points in the optical transmission path to an end, and optical signals are optically amplified and optimum dispersion pre-equalized in each wavelength, the signals are multiplexed and sent out again at the second optical multiplexing circuit to the optical transmission path and transmitted to end through an optical trunk circuit, the signals are divided again to a plural optical signals corresponding to each optical wavelength at receiving end, these optical signals are received by an optical receiver at each wavelength.

This invention realizes not only amplifying amplitude of a signal light by an optical amplifier but also pre-equalizing the signal as they are optical by directly phase modulating signal light against deterioration of waveform of the optical signal caused by wavelength dispersion in an optical transmission path. As the result, 3R repeaters needing opto-electro conversion that complicates the repeater configuration become not necessary.

Moreover, when wavelength-multiplexing N waves, a plurality of sending light sources in different wavelength, high-accurately selected in absolute value of wavelength and wavelength controlled in high accuracy, are enough to be at sending-end. Such light sources are not necessary as far as at each repeater. That is, the system enables a long span trunk transmission by multistage-repeating, without conversion of an optical signal to an electric signal because of dispersion pre-equalization at optical repeaters and signal amplification in light as it is with optical amplifiers. As the result, the wavelength control that requires complexity and high accuracy is possible to be managed unitarily at the sending-end. When occurring deviation of sending wavelength from normality due to deterioration of sending light sources, it is sufficient to change a failed light source to new one only at sending-end. Moreover, in case of the conventional optical trunk transmission system to perform regeneratively repeating by each optical repeater, a plurality of sending light sources are needed for each wavelength and optical repeater. Therefore, there is a big difficulty to deal with a trouble caused by sending light sources. However, the optical trunk transmission system of this invention is sufficient to be equipped with sending light sources only at the sending-end, so that it is easy to provide standby light sources even for the system which requires tens to hundreds of sending light sources. Also it is easy to access directly to sending light sources in the short term in case of repairing sending light sources. Additionally it is easy to coup with foreseen accident in sending light sources of various wavelengths.

BRIEF DESCRIPTION OF THE DRAWINGS

FIG. 4 is a block diagram of the first embodiment of this invention.

FIG. 9 is a block diagram of the second embodiment of this invention.

DESCRIPTION OF THE PREFERRED EMBODIMENTS

Figure 1:
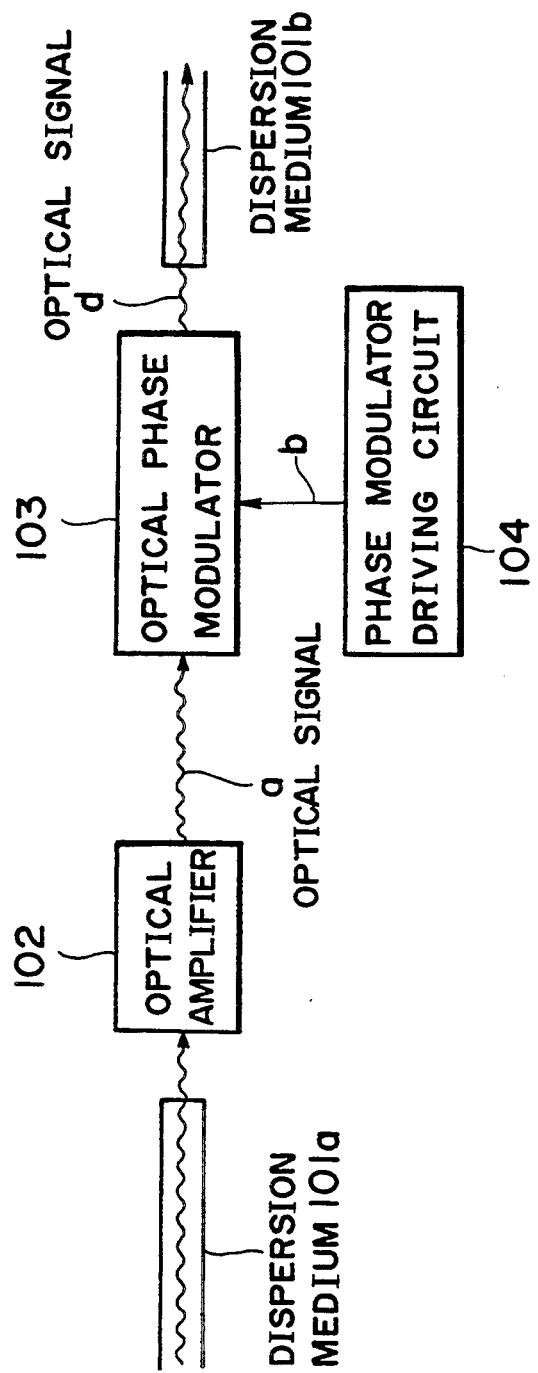
FIG. 1 is a schematic block diagram of a fundamental optical repeater circuit of this invention.
Figure 2A:
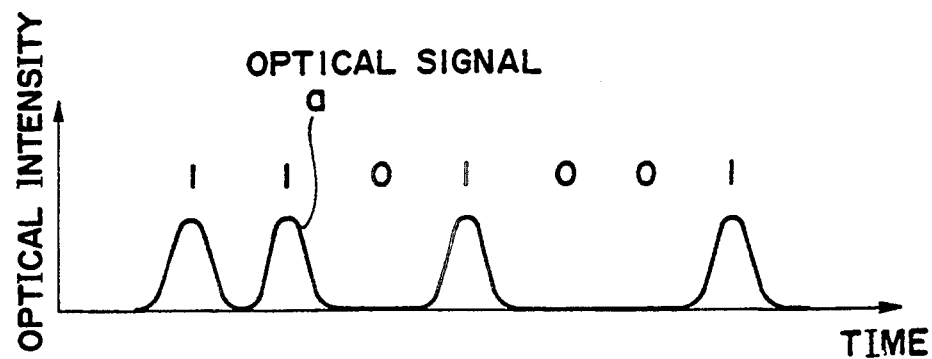
FIGS. 2a to 2d are the first figures to explain the operation of optical repeater circuit shown in FIG. 1.
Figure 2B:
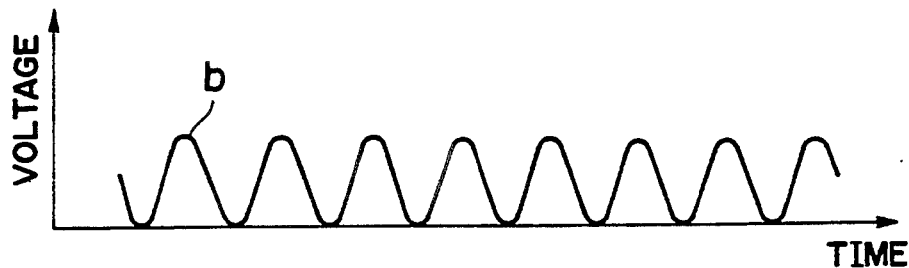
Figure 2C:
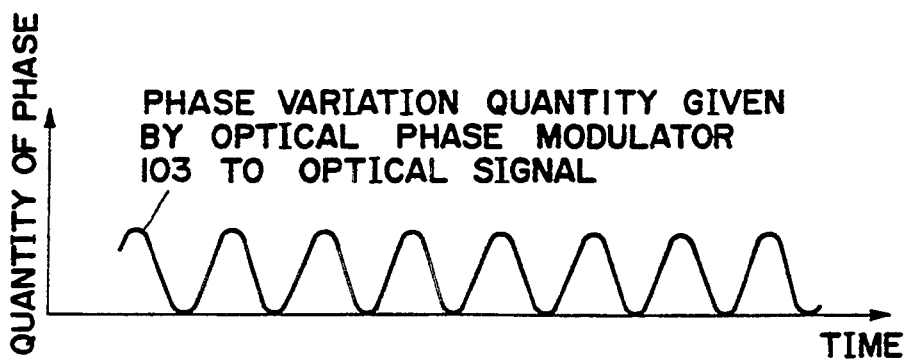

Referring to FIG. 1, the signal light propagating through an optical transmitting medium 101a, of which optical power level is amplified in an optical amplifier 102, inputs to an optical phase modulator 103 as an optical signal a. If the optical signal is an RZ intensity-modulated signal the waveform of the optical signal a becomes approximately same to the waveform of the sending optical signal as shown in FIG. 2a due to dispersion pre-equalization at the sending-end. The signal light supplied to the optical phase modulator 103 is phase-modulated by the signal h output from the phase modulator driving circuit 104. As shown in FIG. 2b, the signal b output from the phase modulator driving circuit 104 is a sine-wave signal having the fundamental frequency of the envelope signal of the optical signal a. As shown in FIG. 2b and FIG. 2a, when the intensity of the optical signal a is maximum, the drive voltage supplied to the optical phase modulator 103 is also maximum. Here, the phase modulator 103 gives a negative phase variation to the optical signal a when the drive voltage of the signal b changes higher position and gives a positive phase variation to the optical signal a when the drive voltage of the signal b changes lower position. Therefore, the optical signal propagating through the optical phase modulator 103 receives maximum phase variation in negative direction when the intensity of the optical signal a is maximum, and maximum phase variation in positive direction when the intensity of the optical signal a is minimum, as shown in FIG. 2c. As the result, the carrier frequency of the optical signal d output from the optical phase modulator 103 deviates lower from the carrier central frequency at the tip or rise of each pulse of the optical signal d and higher from the carrier central frequency at the end or fall of each pulse of the optical signal d as typically shown in FIG. 2d.

Figure 2D:
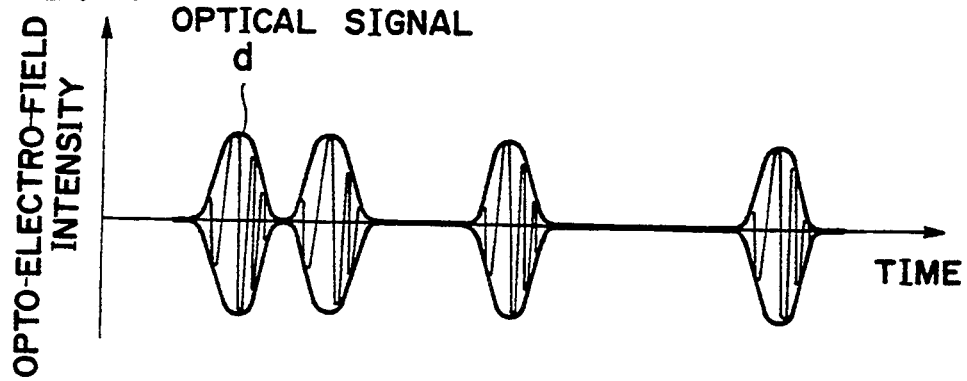
Figure 3A:
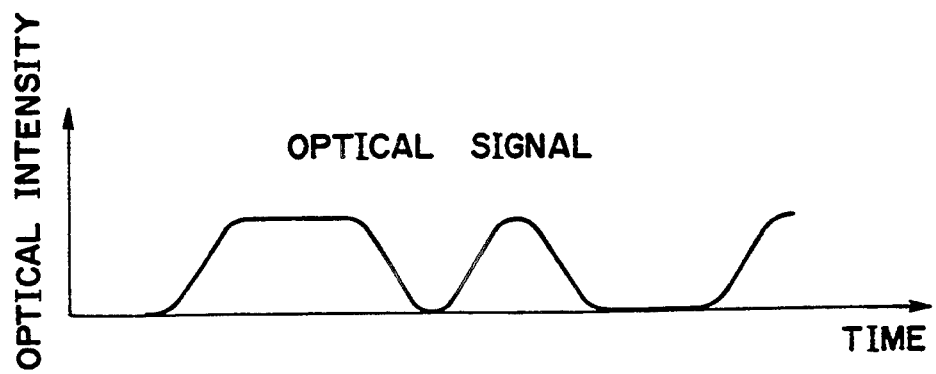
FIGS. 3a to 3d are the second figure to explain the operation of optical repeater circuit shown in FIG. 1.
Figure 3B:
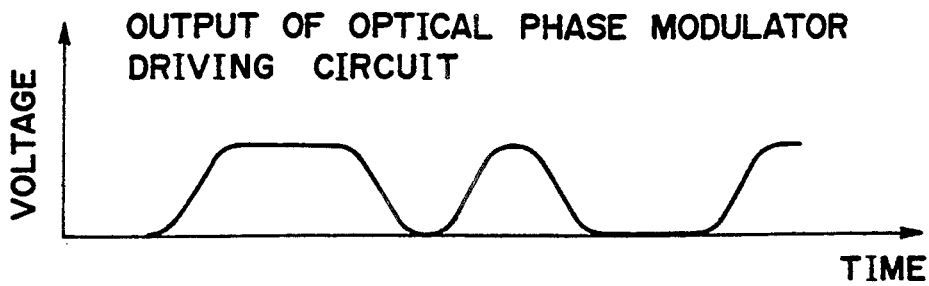
Figure 3C:
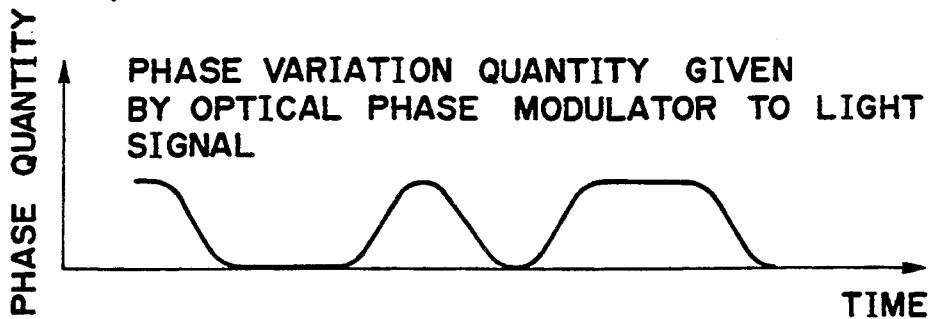

Next, if the optical signal a is an NRZ intensity-modulated signal, similarly to the above, the waveform of the optical signal a becomes approximately same to the waveform of the sending optical signal as shown in FIG. 3a due to dispersion pre-equalization at the sending-end. The optical signal supplied to the optical phase modulator 103 is phase-modulated by the drive signal b output from the phase modulator driving circuit 104. As shown in FIG. 3b, the signal b output from the phase modulator driving circuit 104 is an NRZ signal having the same waveform to the optical signal a. Here, the optical phase modulator 103 gives negative phase variation to the optical signal a when the drive voltage of the signal b changes higher position and gives positive phase variation to the optical signal a when the drive voltage of the signal b changes lower position. Therefore, the phase variation of the signal light propagating through the optical phase modulator 103 becomes as shown in FIG. 3c. As the result, the carrier frequency of the optical signal d output from the optical phase modulator 103 deviates lower from the carrier central frequency at the rise of the optical signal a and higher from the carrier central frequency at the fall of the optical signal a as typically shown in FIG. 2d. In the optical repeating circuit shown in FIG. 1, about 3.2 GHz frequency deviation is given by the modulator 103 for transmitting both the NR and NRZ optical signals of which intensity-modulated signal speed is 10 Gb/s through the dispersion medium of which total dispersion value in length is 1000 ps/nm.

The fact that optical signals of which waveforms are less distorted can be obtained after transmission by this wavelength dispersion pre-equalization, is detailed in said paper by N. Henmi and others reported on Technical Digest PD8 (Post Deadline paper #8) of International Conference on Optical Fiber Communication, 1990.

At first, the first embodiment is explained.

In FIG. 4, the RZ modulated optical signal of which wavelength is 1.57 μm and intensity modulated signal speed is 10 Gb/s, is transmitted through the optical fiber 301a which is a 1.55 μm zero dispersion optical fiber. Then, the RZ modulated signal is supplied to the optical amplifier 302 at optical power level −18 dBm with keeping almostly the same pulse waveform as shown in FIG. 2a. The RZ modulated signal to the optical fiber 301a is dispersion pre-equalized at a sending-end not shown in FIG. 4. The RZ modulated signal is optically amplified to optical power level 10 dBm by the optical amplifier 302.

Most part of the output signal of the optical amplifier 302 is supplied to the optical phase modulator 303 through the optical fibers 301b and 301c, and a part of the output signal (about 1/100) is branched in the optical branching device 304 and converted to electric signal by the receiving circuit 305 including photodiode. The clock extraction (or regenerating) circuit 306 extracts a 10 GHz clock signal from the 10 Gb/s electric signals output from the receiving circuit 305 and outputs 10 Gb/s clock signal whose phase is coincident with the phase of the received optical signal. The clock extraction circuit 306 comprises a cavity for extracting 10 MHz frequency component from the output signal of the receiving circuit 305. The cavity is shown in U.S. Pat. No. 4,737,970. The 10 MHz clock signal from the cavity is sine-wave signal and it is output signal of the clock extracting circuit 306. Now, the phase modulator driving circuit 307 amplifies the clock signal from the clock extraction circuit 306 to a predetermined voltage, arranges the phase of the signal to be a predetermined phase according to the signal from the phase detection circuit 308, and outputs a drive signal to the optical phase modulator 303. Here, as used a phase modulator of which a half wavelength voltage is about 10 V, being given about π/5[rad] phase deviation in peak-to-peak value, a sine-wave drive signal of which peak-to-peak value is about 2.0 V as shown in FIG. 2b. The optical signal input to the optical phase modulator 303 is phase-deviated about π/5[rad] in peak-to-peak value as shown in FIG. 2c by the drive signal. As the result, as schematically shown in FIG. 2d, the carrier frequency of the 10 Gb/s signal is modulated, it is deviated lower from the carrier central frequency at the rise of the optical pulse and higher from the carrier central frequency at the fall of the optical pulse. Here, the optical signal is phase-modulated correspondingly to 1000 ps/nm wavelength dispersion, about 300 km by pre-equalization transmission is practiced in the condition that an average wavelength dispersion value at wavelength 1.57 μm is about 3 ps/nm.km.

Next, the optical phase modulator driving circuit 307, the phase detection circuit 308, the optical phase modulator 303 and the optical amplifier 302 are explained briefly.

Additionally, the configurations of the optical phase modulator driving circuit, the phase detection circuit, the optical phase modulator and the optical amplifier in the embodiments given the details later are similarly to the above.

First of all, the phase detection circuit is explained.

Figure 5:
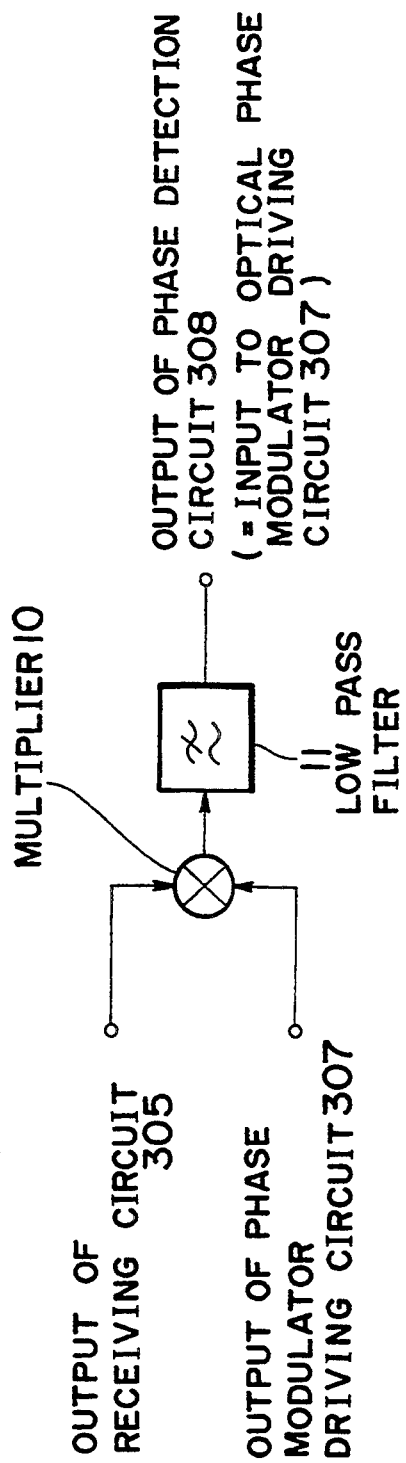
FIG. 5 is the first detailed block diagram to show in detail a part of the first embodiment of this invention.

Two input signals to the phase detection circuit 308 shown in FIG. 5, such as the output of the receiving circuit 305 and the output of the optical phase modulator driving circuit 307 are input to the multiplier 10. The output of the multiplier 10 becomes the output of the phase detection circuit 308 through the low pass filter 11. Here, the output voltage level changes in proportion to the phase difference of the output of the receiving circuit 305 and the output of the optical phase modulator driving circuit 307.

Next, the optical phase modulator driving circuit is explained.

Figure 6:
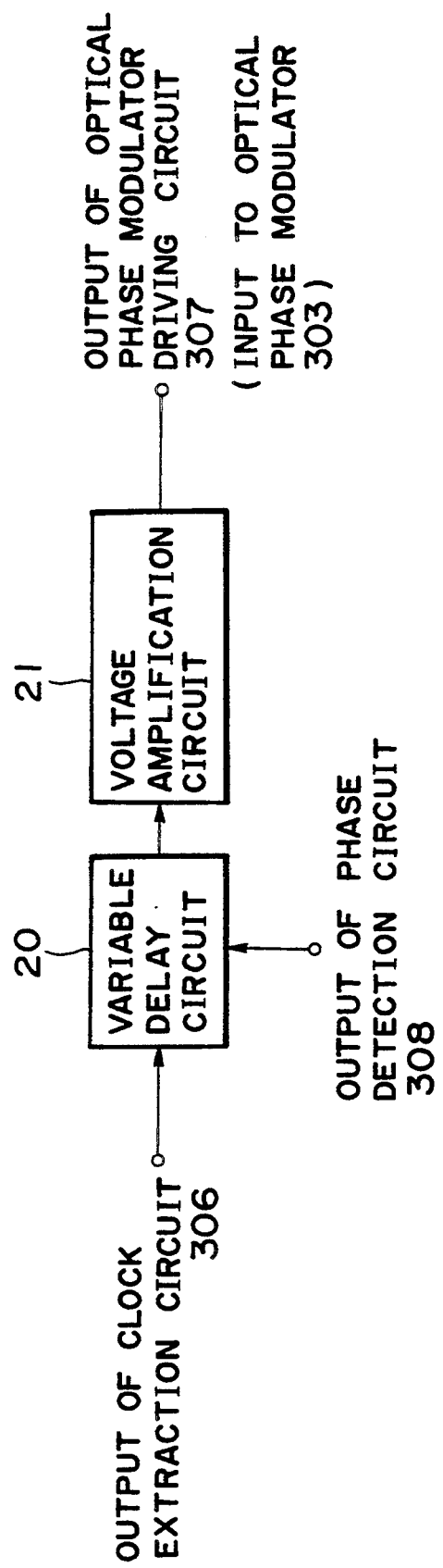
FIG. 6 is the second detailed block diagram to show in detail a part of the first embodiment of this invention.

The output of the phase detection circuit 308 is supplied to the delay quantity control terminal in the voltage driven typed variable delay circuit 20 shown in FIG. 6, and controls the quantity of delay of the output signal from the clock extraction circuit 306. Therefore, the delay value of the signal from the clock extraction circuit 306 is varied corresponding to the output of the phase detection circuit 308. The output of the variable delay circuit 20 is amplified to 2.0 V in peak-to-peak value at the voltage amplification circuit 21, then outputs.

Next, the optical phase modulator is explained.

Figure 7:
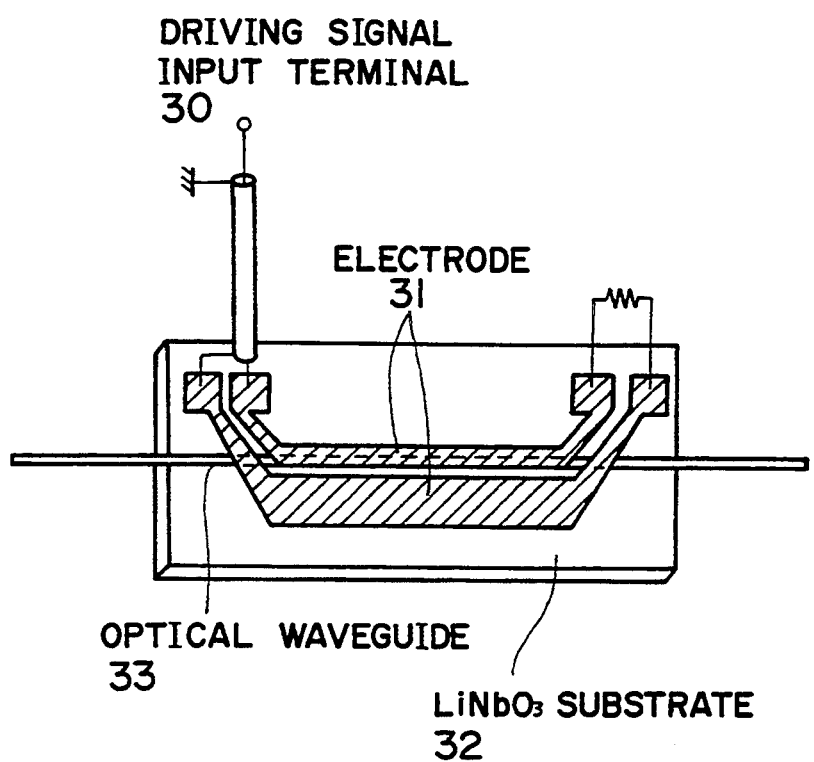
FIG. 7 is a perspective view Showing in detail a part of the first embodiment of this invention.

The output signal of the optical phase modulator driving circuit 307 is supplied to a driving circuit input terminal 30 in the optical phase modulator 303 shown in FIG. 7, and the voltage depending to the signal is charged between the electrodes 31. The refractive index of the optical waveguide 33 formed on a LiNbO$_3$ substrate 32 changes by the electro-opto-effect caused by the voltage charged between the electrodes 31. As the result, The phase of the optical signal propagating in the optical waveguide 33 is modulated.

Figure 8:
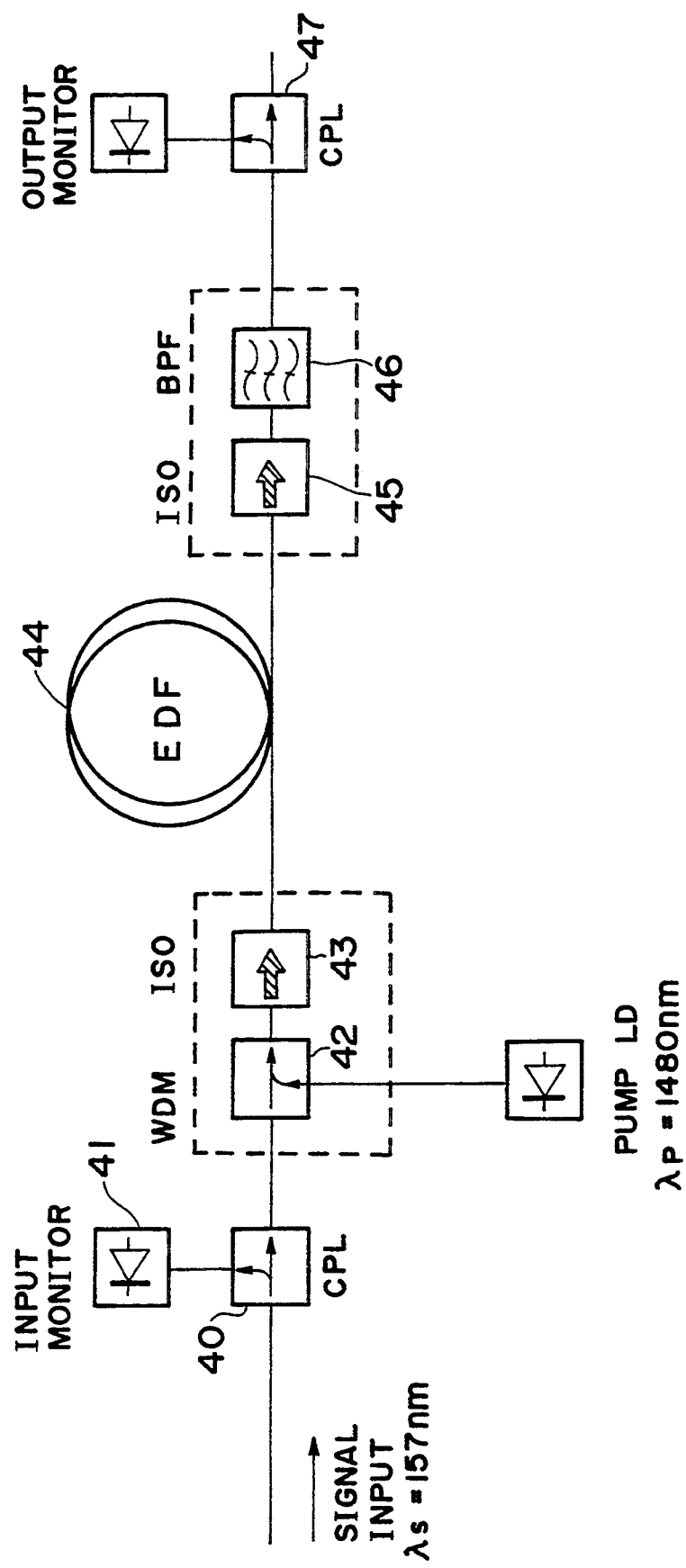
FIG. 8 is the third detailed block diagram to show in detail a part of the first embodiment of this invention.

Next, the optical amplifier is explained. As shown in FIG. 8, a part of the input optical signal of the wavelength 1.57 μm is supplied to the photo diode 41 from the optical coupler(CPL) 40 as the monitor signal and it is monitored. Most part of the input signal which is supplied to the optical wavelength synthesizer(WDM) 42, is synthesized with the 1.48 μm excited signal, and is supplied to the erbium-doped optical fiber(EDF) 44 through the optical isolator (ISO) 43. The signal light of wavelength 1.57 μm is optically amplified in the EDF 44, and supplied to the optical coupler(CPL) 47 through the optical isolator(ISO) 45 and the band pass filter(BPF) 46, a part of them is monitored, thus practically all lights are output.

The above-mentioned band pass filter(BPF) 46 is equipped to filter optical components except the signal light of 1.57 μm. Also, the optical isolator(ISO) 45 is equipped to prevent the reflected backward wave at the access point of the BPF 46.

In the first embodiment, the optical power level of the signal transmitted to the optical fiber 301d, is about 5 dBm due to insertion loss of the optical phase modulator 303. Further, because the transmission loss of the 300 km optical fiber is about 70 to 80 dB, 3 to 4 optical amplifiers should be connected between the two optical repeaters (each optical repeater is shown in FIG. 4) which are located in 300 Km distance. The waveform of the optical signal to the optical repeater in the next step is the approximately same waveform as the optical signal waveform shown in FIG. 2a, and the optical signal can be repeated again like the above-mentioned method and configuration.

Next, the second embodiment is explained.

In FIG. 9, the RZ modulated optical signal of wavelength 1.57 μm and intensity-modulated signal speed 10 Gb/s, is transmitted in the optical fiber 401a of 1.55 μm zero dispersion optical fiber. Then, the RZ optical signal is optically amplified in the optical amplifier 402, and the output light is phase-modulated in the optical phase modulator 403 for performing dispersion pre-equalization is similar to the first embodiment in FIG. 4. However, the method to generate the driving signal to charge on the optical phase modulator 403 is different.

In this embodiment, at first the sinusoidal signal generator 409 generates the sine-wave signal of 10 GHz, the second phase detection circuit 410 detects the phase difference between the sine-wave and the clock signal of the fundamental frequency of the optical signal extracted by the clock extraction circuit 406. The sinusoidal signal generator 409 adjusts a frequency of the sine-wave signal corresponding to the output of the second phase detection circuit 410 so that the frequency is approximately the same as the fundamental frequency of the optical signal. The sine-wave signal from the generator 409 is output to the phase modulator driving circuit 407.

The phase of a driving signal that is an output of the phase modulator 407 is explained as below. The receiving circuit 405 performs the opto-electro-conversion of the optical signal branched a part of the optical signal to the optical phase modulator 403. The phase detection circuit 408 detects the phase difference between the output of the receiving circuit 405 and the output signal of the phase modulation driving circuit 407. By feeding back the phase difference signal to the phase modulator driving circuit 407 as a control signal, it performs phase arrangement for the driving signal in the phase modulator driving circuit 407, so that the phase relation of the envelope of the optical signal in the optical phase modulator 403 and the driving signal similar to the relation shown in FIGS. 2a and 2b.

Next, the third embodiment is explained.

Figure 10:
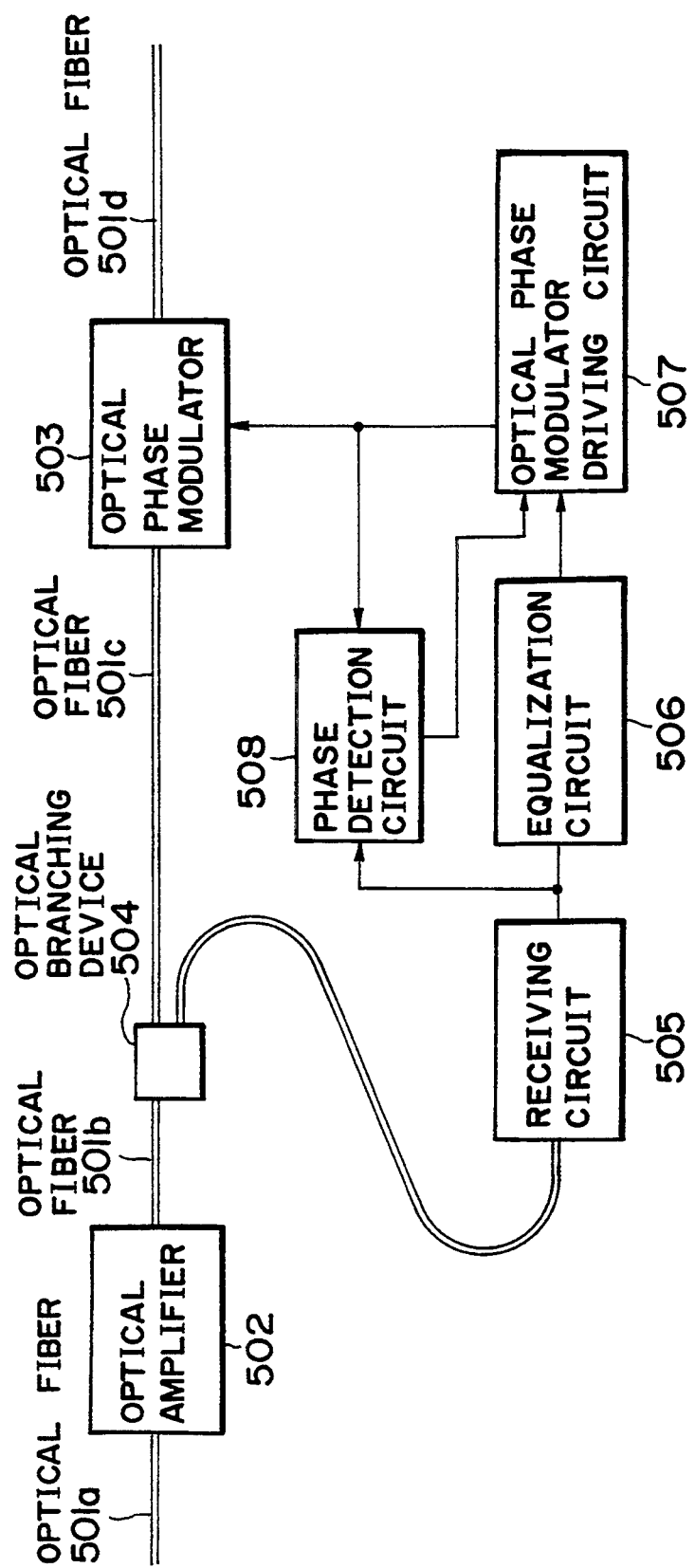
FIG. 10 is a block diagram of the third embodiment of this invention.

In FIG. 10, the NRZ modulated optical signal of which wavelength is 1.57 μm and intensity-modulated signal speed is 10 Gb/s, transmitted through the optical fiber 501a that is a 1.55 μm zero dispersion optical fiber, is supplied to the optical amplifier 502 at optical power level −18 dBm. The NRZ optical signal has approximately the same pulse waveform as the optical pulse waveform as shown in FIG. 3a by dispersion pre-equalization at a sending-end (not shown in FIG. 10), and optically amplified to optical power level 10 dBm by the optical amplifier 502.

Figure 3D:
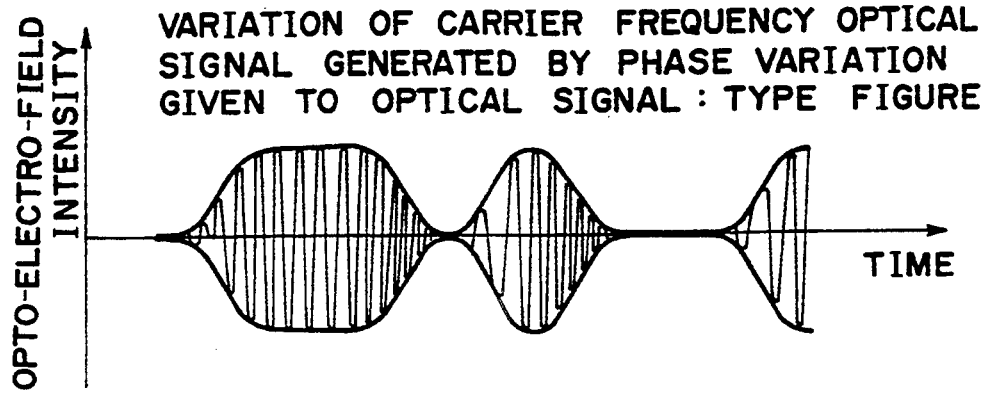

The most part of the output signal of the optical amplifier 502 is supplied to the optical phase modulator 503 through the optical fiber 501b, the optical branching device 504 and the optical fiber 501c, and a part of them (about 1/100) is branched in the optical branching device 504 and converted to electric signal in the receiving circuit 505. The waveform of this receiving signal is equalized by the equalization circuit 506 to be approximately same NRZ signal waveform of the input optical signal to the phase modulator 503. The optical phase modulator driving circuit 507 converts the equalized NRZ signal to the NRZ signal having a predetermined peak value of output voltage. The phase detection circuit 508 detects the phase difference between the phase of the input signal, which is monitored in the receiving circuit 505, and the phase of output signal of the optical phase modulator driving circuit 507. By feeding back the result to the optical phase modulator driving circuit 507, it controls the phase difference to be zero approximately. The output voltage of the optical phase modulator driving circuit 507 is charged on the optical phase modulator 503. Here, as used a phase modulator of which a half wavelength voltage is about 5 V, being given about 2π/5[rad] phase deviation in peak-to-peak value, the NRZ signal of which peak-to-peak value is about 2.0 V as shown in FIG. 3b. The optical signal supplied to the optical phase modulator 503 is phase-deviated about 2π/5[rad] in peak-to-peak value as shown in FIG. 3c by the drive signal. As the result, as typically shown in FIG. 3d, the carrier frequency of the 10 Gb/s signal is modulated, it is deviated lower from the carrier central frequency at the rise of the optical pulse and higher from the carrier central frequency at the fall of the optical pulse. Here, the optical signal is phase-modulated correspondingly to 1000 ps/nm wavelength dispersion, about 300 km by pre-equalization transmission is practiced in the condition that an average wavelength dispersion value at wavelength 1.57 μm is about 3 ps/nm.km.

Moreover, the optical power level transmitted to the optical fiber 501d is about 5 dBm due to insertion loss of the optical phase modulator 503. Further, since the transmission loss of the 300 km optical fiber is about 70 to 80 dB, 3 to 4 optical amplifiers should be connected between the two optical repeaters (each optical repeater is shown in FIG. 10) which are located in 300 Km distance. The waveform of the input signal to the optical repeater in the next step is the approximately same waveform to the optical signal waveform shown in FIG. 3a, and the optical signal can be repeated again like the above-mentioned method and configuration.

Next, the fourth embodiment is explained.

Figure 11:
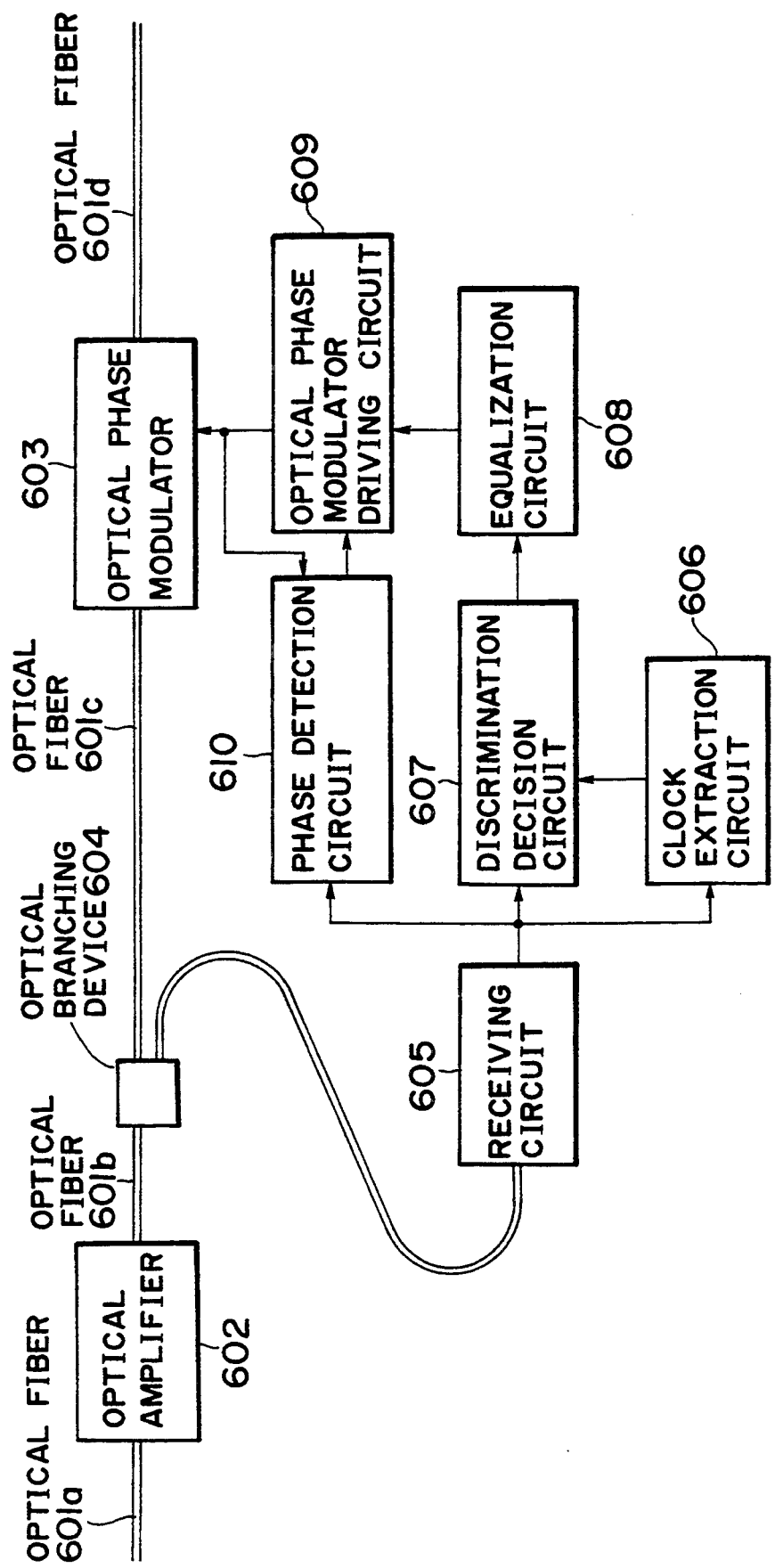
FIG. 11 is a block diagram of the fourth embodiment of this invention.

In FIG. 11, the NRZ modulated optical signal of wavelength 1.57 μm and intensity modulated signal speed 10 Gb/s, is transmitted in the optical fiber 601a of 1.55 μm zero dispersion optical fiber. Then the NRZ optical signal is optically amplified in the optical amplifier 602, and the output light is phase-modulated in the optical phase modulator 603 for performing dispersion pre-equalization like the same way as the third embodiment. However, the method to generate the driving signal to charge on the optical phase modulator 603 is different.

In this embodiment the output signal of the receiving circuit 605 is discriminated in the discrimination decision circuit 607 in response to the clock signal extracted in the clock extraction circuit 606, and then performed equalization of waveform in the equalization circuit 608. The signal output from the equalization circuit 608 is converted to a drive signal by the optical phase modulator driving circuit 609. The signal level of the driving signal and the phase control of the driving signal utilizing the output of the phase detection circuit 610 are similar to them of the third embodiment.

Next, the fifth embodiment is explained.

Figure 12:
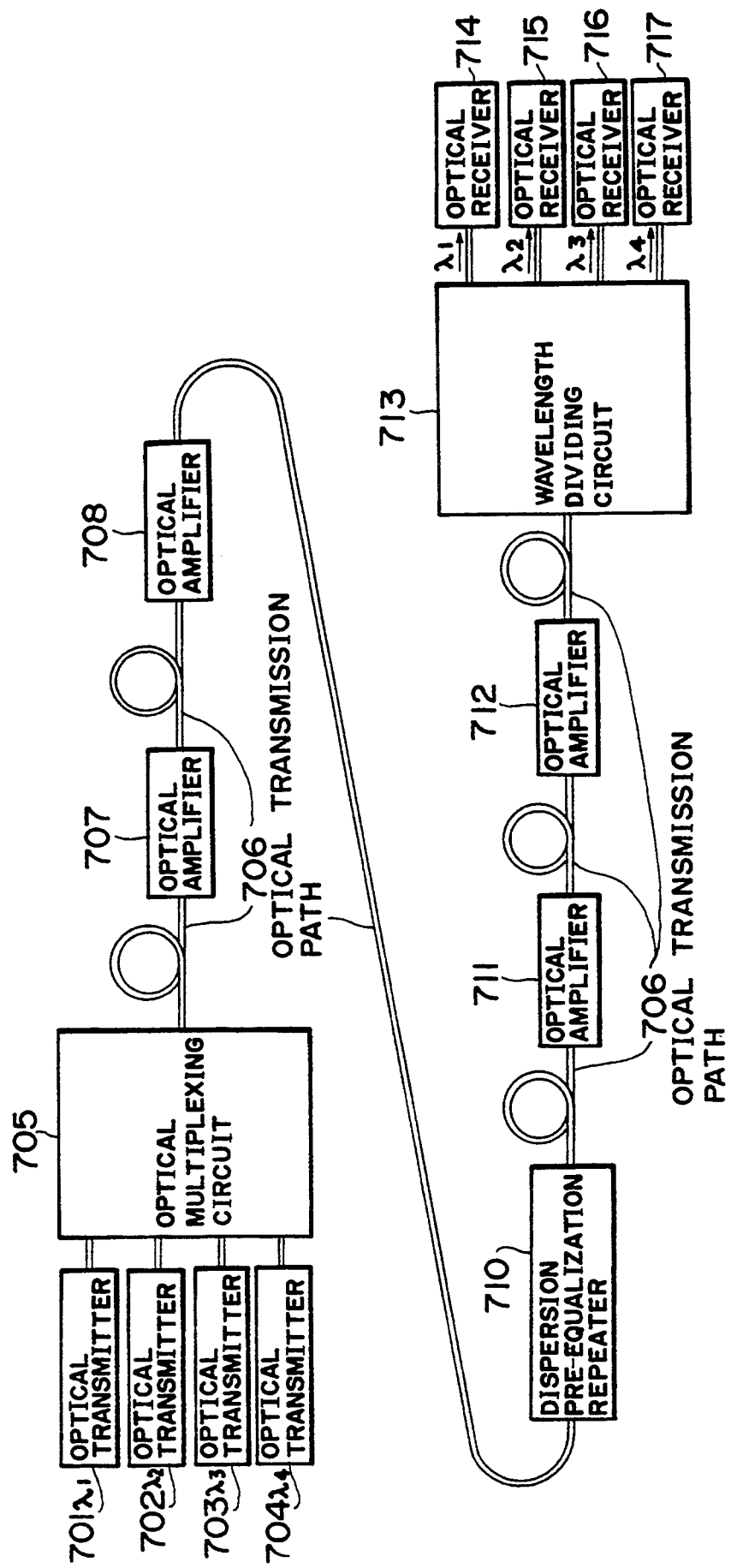
FIG. 12 is a block diagram of the fifth embodiment of this invention.

In FIG. 12, the transmission optical signals of wavelength λ1 to wavelength λ4, are respectively sent from optical transmitters 701 to 704, and then, they are waveform-multiplexed in the optical multiplexing circuit 705, and sent out to the optical transmission path 706 consisting of the optical fiber of which zero dispersion wavelength is 1.55 μm. Here, the wavelengths are $\lambda 1 = 1.555$ μm, $\lambda 2 = 1.560$ μm, $\lambda 3 = 1.565$ μm and $\lambda 4 = 1.570$ μm, respectively, and the outputs of the sending signals to the optical transmission path 706 are all +3 dBm.

Figure 13:
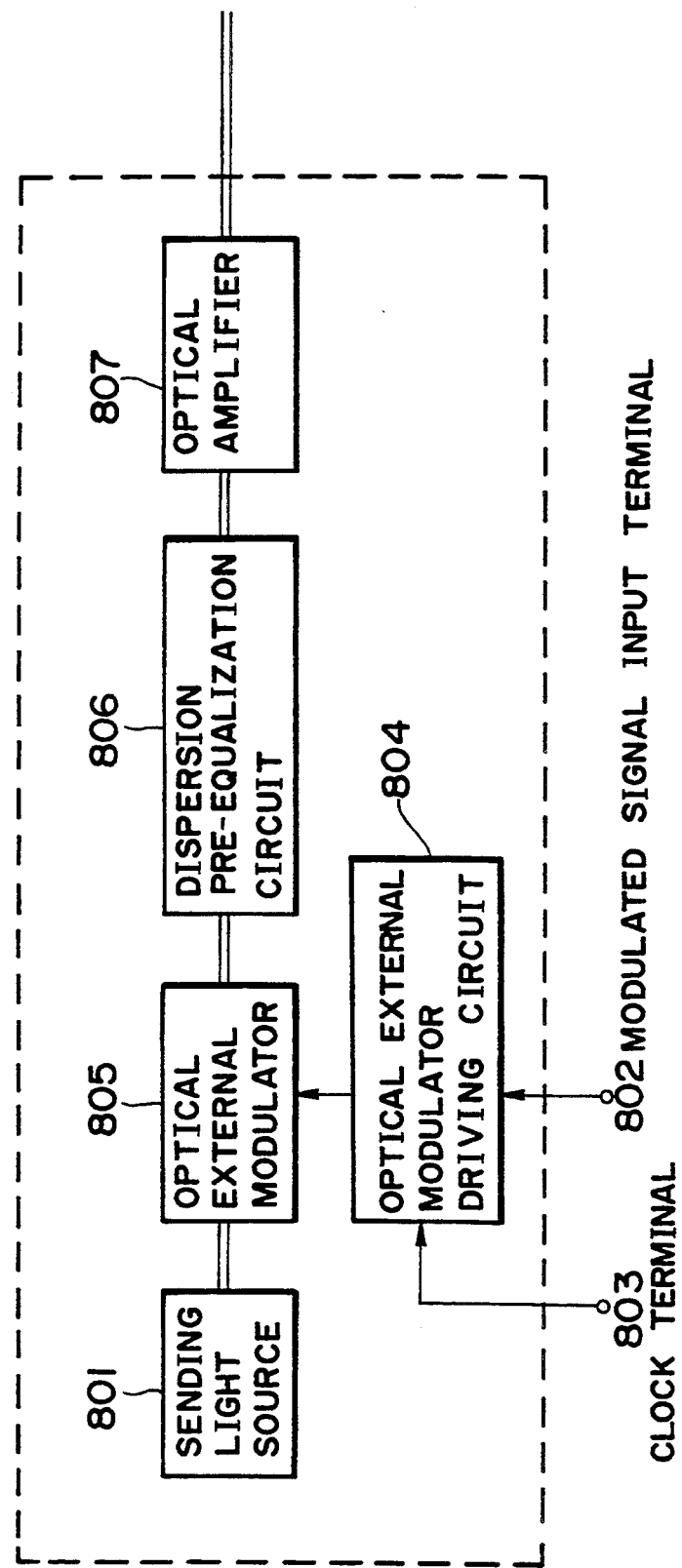
FIG. 13 is the first detailed block diagram to show in detail a part of configuration of the fifth embodiment of this invention.

The configurations of the optical transmitters 701 to 704 are explained referring the optical transmitter 704 as an example using FIG. 13. The optical transmitters 701 to 703 are only different in the wavelength of the sending light source and the dispersion equalization quantity given at the dispersion equalization circuit, others are completely similar to the optical transmitter 704.

In FIG. 13, a distribution feedback type semiconductor laser 801 that is a sending light source emits a DC light of wavelength $\lambda 4$. It is intensity-modulated correspondingly to the data signal in the optical external modulator 805 driven by the optical external modulator driving circuit 804 according to an RZ (Return-to-zero) modulated data signals of 10 Gb/s supplied to the modulated signal input terminal 802 and the clock signal of 10 Gb/s supplied to the clock input terminal 803. Then, so called prechirp is performed to pre-equalize against wavelength dispersion in the dispersion pre-equalization circuit 806. The optical signal performed dispersion pre-equalization is optically amplified to +6 dBm in the optical amplifier 807, and sent out to the optical multiplexing circuit 705 in FIG. 12. Here, as the insertion loss of the optical multiplexing circuit 705 is about 4 dB, the optical sending power level of each wavelength to the optical transmission path 706 is +2 dBm.

The dispersion pre-equalization circuit 806 is preferable to be similar to them of the first and second embodiments.

Now, being optically amplified in the optical amplifiers 707 and 708 installed in each 80 km, the optical signals of $\lambda 1$ to $\lambda 4$ sent out to the optical transmission path 706 are transmitted as far as 240 km, and supplied to the dispersion pre-equalization repeater 710 that performs dispersion pre-equalization and optical amplification. Here, the transmission loss of the optical fiber that is a transmission path is about 0.25 dB/km in each wavelength, the input levels of the optical signals in each wavelength to the optical amplifiers 707 and 708 are all −18 dBm, gain in the optical amplifier for the optical signal in each wavelength is 20 dB, and the output level of the optical signals in each wavelength are +2 dBm. Therefore, the input levels of the optical signals in each wavelength to the dispersion pre-equalization optical repeater 710 are −18 dBm. In this dispersion pre-equalization optical repeater, dispersion pre-equalization is performed to the optical signals in each wavelength, the optical signals in each wavelength are optically amplified to +2 dBm, and sent out to the optical transmission path 706 again. The configuration and functions of this dispersion pre-equalization repeater are explained using FIG. 14.

Figure 14:
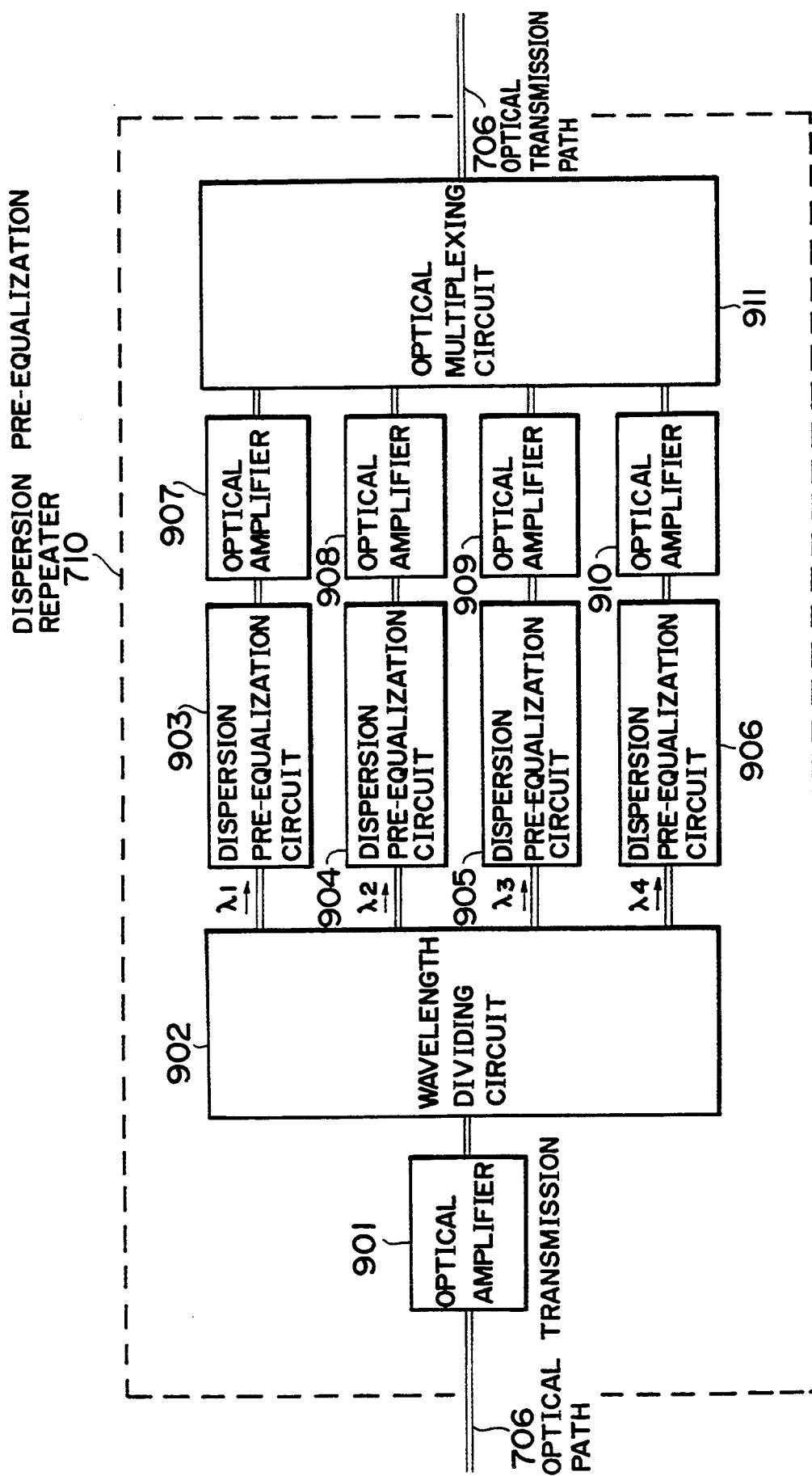
FIG. 14 is the second detailed block diagram to show in detail a part of configuration of the fifth embodiment of this invention.

FIG. 14 is a block diagram showing the configuration of the dispersion pre-equalization repeater 710. The optical signals in each wavelength transmitted through the optical transmission path 706 are respectively supplied to the optical amplifier 901 at −18 dBm in each optical signal power level. The optical amplifier 901 outputs an optical signal at −8 dBm in optical power level and in each wavelength after obtaining 10 dB gain. The optical signals multiplied in wavelength are divided to components in the wavelength dividing circuit 902. The signals of wavelength $\lambda 1$ to $\lambda 4$ are output to first to fourth dispersion pre-equalization circuits 903 to 906, respectively. The configurations of these dispersion pre-equalization circuits, as well as the optical transmitters, are preferably to be similar to them in the first embodiment and the second embodiment. The optical signals in each wavelength performed dispersion pre-equalization are dispersion-pre-equalized by the sending devices 701 to 704 of each wavelength for sending length 240km for each wavelength hereinbefore. In order to approximately reproduce the output waveforms of the optical transmitters 701 to 704 (in FIG. 12), the divided signals are respectively transmitted to the dispersion pre-equalization circuits 903 to 906. These optical input signals are performed dispersion pre-equalization in each wavelength like the dispersion pre-equalization circuits in the optical transmitters 701 to 704. After this dispersion pre-equalization, optical amplification is performed in the first to fourth optical amplifiers 907 to 910 connected in backward of the optical phase modulator to compensate insertion loss of the dispersion pre-equalization circuit and the optical multiplexing circuit in backward step, and gain 22 dB is given. The optical signals in each wavelength performed dispersion pre-equalization and optical amplification are multiplexed in wavelength in the optical wavelength multiplexing circuit 911, and then transmitted to the optical transmission path 706 again. Here, as loss in the wavelength demultiplexing circuit 902 is 4 dB, losses in the dispersion pre-equalization circuits 903 to 906 are respectively 4 dB, also loss in the optical multiplexing circuit 911 is 4 dB, the output level of the optical multiplexing circuit 911 to the optical transmission path 706 is +2 dBm.

In the optical transmission from the dispersion pre-equalization optical repeater 710 to the wavelength dividing circuit 713 installed in, forward of the optical receivers for each wavelength 714 to 717, the transmission conditions such as optical sending power level to the optical transmission path 706, transmission length, characteristics of the optical fiber that is the optical transmission path, gain of the two optical amplifiers installed in the transmission path and optical receiving power level are set up approximately similar to the conditions from the output terminal of the optical wavelength multiplexing circuit 705 in backward of the optical transmitters 701 to 704 to the dispersion pre-equalization optical repeater 710, so that, approximately same transmission characteristics from the optical transmitters 701 to 704 to the dispersion pre-equalization optical repeater 710. The optical signal level of each wavelength input to the wavelength dividing circuit 713 in front of the optical receiver 714 to 717 of each wavelength is −18 dBm, the optical signal level to the optical receivers is −22 dBm (that is, insertion loss of the wavelength dividing circuit 713 is 4 dB), also receiving waveforms are approximately reproduced the sending forms, thus optical signals of each wavelength are received in the optical receivers 714 to 717. Moreover, the minimum receiving sensitivity of the optical receivers is about −27 dBm, there is about 5 dB margin.

In the fifth embodiment, the number of the different wavelength is set up four, but the number is not restrictive to this. Also it is clear that multi-step connection is feasible although the number of the step of dispersion pre-equalization optical repeater that performs dispersion pre-equalization is set up one. It is feasible to practice similar dispersion pre-equalization optical trunk transmission for the NRZ modulated signals. In this case, for the dispersion pre-equalization circuit is preferable to it in the third embodiment and fourth embodiment. Also the distance from the optical amplifier nearest to the receiving end to the receiving end is supposed 80 km. However, the minimum receiving sensitivity can be raised over 10 dB if utilizing an optical amplifier as an optical pre-amplifier in the optical receiver. Therefore, it is possible to expand this distance to 120 km. In this case, however, the dispersion quantity of dispersion pre-equalization in the optical repeater is not for 240 km, but for 280 km. Although the wavelength of the light source is supposed 1.55 μm band, it is not restrictive to this value. For example, it is also feasible 1.3 μm band. Further, the wavelength band is supposed longer side than zero dispersion wavelength, this is not also restrictive. However, the direction of chirping (the code of phase variation) is reversed in the longer side and shorter side than zero dispersion wavelength.

What is claimed is:

1. An optical signal transmission method for transmitting an amplitude modulated optical signal through a dispersion medium comprising the steps of:
    (a) generating a phase modulation signal having a frequency corresponding to a fundamental frequency of an envelope of amplitude modulation signal of said amplitude modulated optical signal; and
    (b) phase modulating said amplitude modulated optical signal by said phase modulation signal and outputting a resultant signal to said dispersion medium.

2. The optical signal transmission method as claimed in claim 1, wherein said amplitude modulation signal is an RZ signal and said phase modulation signal is a sine wave.

3. The optical signal transmission method as claimed in claim 1, wherein said amplitude modulation signal is an NRZ signal, and said phase modulation signal is obtained by equalizing and amplifying said NRZ signal.

4. The optical signal transmission method as claimed in claim 1, wherein said amplitude modulation signal is an NRZ signal and said phase modulation signal is obtained by discriminating said NRZ signal and waveform equalizing said discriminated signal.

* * * * *